United States Patent [19]

Pabon, Jr. et al.

[11] Patent Number: 5,310,809
[45] Date of Patent: May 10, 1994

[54] ARYLCYCLOBUTENE GRAFTED POLYOLEFINS

[75] Inventors: Raul A. Pabon, Jr., Houston, Tex.; Robert A. DeVries, Midland, Mich.

[73] Assignee: The Dow Chemical Company, Midland, Mich.

[21] Appl. No.: 64,533

[22] Filed: May 20, 1993

[51] Int. Cl.[5] .................. C08F 255/02; C08L 51/06
[52] U.S. Cl. .................................... 525/289; 525/288; 525/276; 525/292; 525/65; 525/66; 525/67; 525/74; 525/75
[58] Field of Search ............... 525/288, 289, 65, 66, 525/67, 74, 75, 276, 292

[56] References Cited

U.S. PATENT DOCUMENTS

| | | |
|---|---|---|
| 4,540,763 | 9/1985 | Kirchhoff . |
| 4,562,280 | 12/1985 | Gilpin et al. . |
| 4,622,375 | 11/1986 | Wong . |
| 4,642,329 | 2/1987 | Kirchhoff et al. . |
| 4,667,004 | 5/1987 | Wong . |
| 4,667,005 | 5/1987 | Wong . |
| 4,698,394 | 10/1987 | Wong . |
| 4,708,990 | 11/1987 | Wong et al. . |
| 4,708,994 | 11/1987 | Wong . |
| 4,724,260 | 2/1988 | Kirchhoff et al. . |
| 4,762,890 | 8/1988 | Strait et al. . |
| 4,950,541 | 8/1990 | Tabor et al. . |

Primary Examiner—Vasu S. Jagannathan

[57] ABSTRACT

An olefinic polymer is grafted with a vinyl arylcyclobutene such as 4-vinylbenzocyclobutene. The arylcyclobutene grafted olefinic polymers are useful in a number of industrial applications including electronics, and as coatings, membranes, fibers, structural composites, adhesives, and wrapping and packaging films.

20 Claims, No Drawings

ARYLCYCLOBUTENE GRAFTED POLYOLEFINS

BACKGROUND OF THE INVENTION

This invention relates to olefinic polymers grafted with a vinyl arylcyclobutene and to a method for preparing the arylcyclobutene grafted olefinic polymers, particularly a method for grafting a vinyl arylcyclobutene on an ethylene polymer.

Olefinic polymers, e.g., ethylene polymers, are employed to produce a variety of products such as blown film and in a wide variety of end use applications including blow molding applications. In many such applications and uses, it is desirable to improve the processability (e.g., more desirable flow characteristics during the processing of ethylene polymer). For example, it is known that long chain branching or lightly cross-linking an ethylene polymer will change its melt rheology and hence, flow characteristics. In addition, cross-linking an ethylene polymer has been shown to improve its creep resistance properties. Ethylene polymers are often cross-linked using a peroxide initiator. However, such cross-linking is not always desirable due to the formation of bubbles on the finished product due to decomposition of the peroxide, premature cross-linking and the interference of the cross-linking reaction by antioxidants which are also radical scavengers.

U.S. Pat. No. 4,622,375 describes the copolymerization of an α-monoolefin with an olefinic benzocyclobutene monomer of the formula:

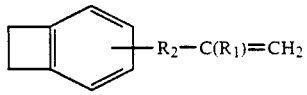

where $R_1$ is hydrogen or $CH_3$ and $R_2$ is $-(CH_2)_n-$ where n is from 0 to 6. The copolymer is prepared using coordination catalysts of the Ziegler-Natta type conventionally employed in the preparation of linear low density and high density polyethylene. The resulting olefin/cyclobutene copolymers are cross-linkable. Unfortunately, cross-linking in such copolymers may occur prematurely. For example, the copolymer can be exposed to sufficiently high temperatures in the final processing steps following polymerization such as post-reactor devolitization to remove unreacted monomer to cause gel problems. In addition, it is difficult to accurately determine the amounts of the cyclobutene which is being incorporated within the copolymer.

In view of the stated deficiencies of the prior art, it remains desirable to provide an ethylene polymer which has or is capable of having long chain branching or light cross-linking.

SUMMARY OF INVENTION

Accordingly, in one aspect, the present invention is an olefinic polymer grafted with a vinyl arylcyclobutene of the formula:

(I)

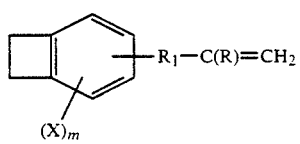

wherein R is hydrogen or $CH_3$; $R_1$ is $-(CH_2)_n-$ where n is from 0 to 6; and X is halogen, an alkyl group having from 1 to 4 carbon atoms, phenyl, or $Si(CH_3)_3$ and m is 0 or 1.

In another aspect, the present invention is a grafted polymer of the present invention having repeat units of the structural formulae:

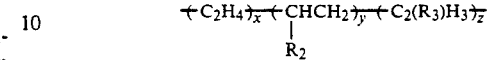

where $-R_2$ is

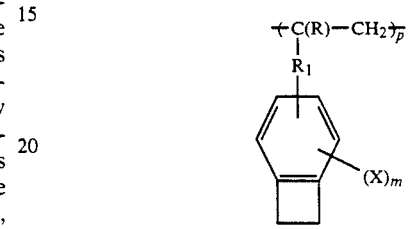

R, $R_1$, X, and m are as hereinbefore defined; $R_3$ is an alkyl group having from 2 to 18 carbon atoms; x can be essentially any number more than 1; y can be 1 or more; z is 0 or a number of 1 or more; and p is 2 or more.

In yet another aspect, the present invention is a method for preparing an arylcyclobutene grafted olefinic polymer which method comprises reacting an olefinic polymer with a vinyl arylcyclobutene of the formula (I) in the presence of an amount of a free radical initiation means and at conditions sufficient to graft the vinyl arylcyclobutene to the polymer chain.

Upon exposure to sufficiently high temperatures, the arylcyclobutene grafted olefinic polymers react with one another without the need for a catalyst or promoter such as a peroxide to form cross-linked or long chain branched polymer. Since the amounts of arylcyclobutene incorporated into the olefinic polymer can be readily controlled, the amounts of long chain branching or cross-linking can also be controlled, thereby making a polymer of desired properties. The grafted polymers, particularly, grafted ethylene polymers are especially suited for preparing lightly cross-linked polymers which do not exhibit gel. These low levels of cross-linking result in a polymer having improved processability as well as improved optical and physical/mechanical properties such as improved optical properties such as transparency and physical properties such as blown-film bubble stability.

The arylcyclobutene grafted olefinic polymers prepared are useful in a large variety of industrial applications including electronic insulated coatings, electrical insulation, wire coating, protective and release coatings, gas separation membranes, fibers, structural composites, adhesives, and wrapping and packaging films.

DETAILED DESCRIPTION OF THE INVENTION

As used herein the term "olefinic polymer" means a polymer of an ethylenically unsaturated aliphatic hydrocarbon. The monomers used in preparing the olefinic polymers generally have the formula $H_2C=CHR'$ where $R'$ is hydrogen or an alkyl group, advantageously an alkyl group having from one to about 10 carbon atoms, such as ethylene, propylene, 1-butene, 1-pentene, 4-methyl-1-pentene, 1-hexene, 1-octene, 1-decene and 1-dodecene, including copolymers of one or more such olefinic monomers.

Preferably, the olefinic polymer is a polymer derived solely from ethylene or ethylene and one or more monomers copolymerizable therewith. Such polymers are well-known in the art and reference is made thereto for the purpose of this invention. Additional comonomers which can be polymerized with ethylene include α-olefin monomers having from 3 to 12 carbon atoms, α,β-ethylenically unsaturated carboxylic acids (both mono- and difunctional) and derivatives of such acids such as esters (e.g., alkyl acrylates) and anhydrides; monovinylidene aromatics and monovinylidene aromatics substituted with a moiety other than halogen such as styrene and methylstyrene; and carbon monoxide. Exemplary monomers which can be polymerized with ethylene include 1-octene, acrylic acid, methacrylic acid, vinyl acetate and maleic anhydride.

The ethylene polymers advantageously comprise at least about 50 weight percent ethylene, with the preferred ethylene polymers comprising at least about 75 weight percent ethylene and the more preferred ethylene polymers comprising at least about 85 weight percent ethylene. The preferred ethylene polymers include low density polyethylene, high density polyethylene, linear low density polyethylene (a copolymer of ethylene and up to about 20 weight percent of one or more additional α-olefins having from 3 to 12 carbon atoms, preferably from 4 to 10 carbon atoms, more preferably from 4 to 8 carbon atoms). In general, high density polyethylene and linear low density polyethylene are particularly useful in the practice of the present invention, and, to a lesser extent, due to its higher amounts of branching, low density polyethylene. The present invention is also useful for blends of two or more ethylene polymers.

Suitable methods for the preparation of high density polyethylene, low density polyethylene, and linear low density polyethylene polymers are well-known in the art and reference is made thereto for the purposes of this invention.

Linear low density polyethylene (LLDPE) is conventionally a copolymer of ethylene and an α-olefin having 4 or more carbon atoms, preferably from 4 to 10 carbon atoms. LLDPE generally comprises a structure which is intermediate between the long linear chains of HDPE and more highly branched chains of LDPE. The density of LLDPE generally varies from about 0.91 to about 0.94 grams per cubic centimeter (ASTM D-792). Illustrative techniques for the preparation of LLDPE are described U.S. Pat. Nos. 2,825,721; 2,993,876; 3,250,825; and 4,204,050. As described in these references, in general, LLDPE is prepared by polymerizing a mixture of the desired types and amounts of monomers in the presence of a catalytically effective amount (normally from about 0.01 to about 10 weight percent based on the weight of the ethylene being polymerized) of a coordination catalyst such as described in U.K. Patent 1,500,873. In general, the polymerization is conducted at relatively low pressures (e.g., from about 5 to about 40, preferably from about 5 to about 15, atmospheres) and temperatures from about 0° to about 300° C., more preferably from about 60° to about 160° C.

Preferred linear low density polyethylenes include copolymers of ethylene with 1-octene, 1-butene, 4-methyl-1-pentene, or 1-hexene, more preferably 1-octene. Preferably, the LLDPE copolymers are a copolymer comprising, in polymerized form, from about 99.5 to about 65, more preferably from about 99 to 80, weight percent ethylene and from about 0.5 to about 35, more preferably from about 1 to about 20, weight percent of the higher α-olefin, said weight percents being based on the total weight of the ethylene and higher α-olefin in the resulting copolymer. Most preferably, the LLDPE copolymers comprise from about 2 to about 15 weight percent 1-octene, 4-methyl-1-pentene, 1-butene, 1-hexene, or most preferably 1-octene.

In general, high density polyethylene (HDPE) has a density of at least about 0.94 grams per cubic centimeter (g/cc) (ASTM Test Method D-1505). HDPE is commonly produced using techniques similar to the preparation of linear low density polyethylene. When HDPE is employed in the practice of the present invention, it preferably has a density from about 0.96 to about 0.99 g/cc and a melt index from about 0.01 to about 35 grams per 10 minutes as determined by ASTM Test Method D-1238.

Low density polyethylene ("LDPE") is generally comprised of highly branched chains with a density of less than about 0.94, generally from about 0.91 to about 0.94, grams per cubic centimeter (g/cc) (ASTM D-792). Illustrative of techniques for preparing LDPE are described in U.S. Pat. Nos. 3,756,996 and 3,628,918. As described therein, LDPE is conventionally prepared in the presence of a catalytic effective amount of a free radical initiator, e.g., a peroxide such di-tert-butylperoxide or tert-butylperacetate in amounts from 0.1 to about 2 weight percent based on the weight of the monomers. In addition, small amounts of oxygen, e.g., from about 1 to about 100 weight parts per one million parts of monomer are generally advantageously employed in the polymerization. Typically, the polymerization is conducted at relatively high pressures (e.g., from about 100 to about 3000 atmospheres) and temperatures (from about 50° to about 350° C.). In general, pressures from 1000 to 2000 atmospheres and temperatures from 100° to about 300° C. are more typically employed.

The vinyl arylcyclobutene used in grafting the ethylene polymer has the formula:

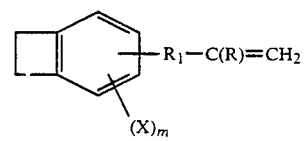

(I)

where R is hydrogen or $CH_3$; $R_1$ is $-(CH_2)_n$ where n is from 0 to 6; X is halogen (preferably bromine), alkyl having from 1 to 4 carbon atoms, $Si(CH_3)_3$, or phenyl; and m is 0 or 1. Preferably, n is from 0 to 4, more preferably from 0 to 2; and m is preferably 0. Most preferably, R is hydrogen, n is either 0 or 1, and m is 0.

Preferably, the grafted olefinic polymer has at least one pendant group represented by the formula:

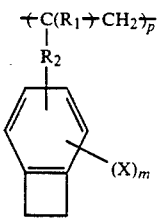

where $R_1$; $R_2$; and X are as described hereinbefore; p is at least 2; and m is 0 or 1, preferably 0.

Suitable methods for the preparation of the vinyl arylcyclobutenes are well-known in the art and reference is made thereto for the purposes of this invention. Representative of such methods are described in U.S. Pat. Nos. 4,642,329 and 4,724,260 to Kirchhoff et al.; U.S. Pat. No. 4,562,280 to Gilpin et al.; and U.S. Pat. No. 4,540,763 to Kirchhoff.

As described in these references, the vinyl arylcyclobutene is generally prepared by reacting a suitably substituted arylcyclobutene compound with an ethylenically unsaturated compound having a moiety reactive with the substituted arylcyclobutene.

In one synthesis method, an alkyl substituted benzene further substituted with an aryl deactivating substituent is chloroalkylated in a position ortho to the alkyl group by contacting the alkylated benzene with a chloroalkylating agent (preferably chloromethyl methyl ether or bis(chloromethyl) ether) and thionyl chloride in the presence of an iron chloride ($FeCl_3$) catalyst, generally in a suitable solvent such as a chlorinated hydrocarbon. The chloroalkylating agent is used in a molar amount of at least 2:1, preferably 3:1 with respect to the substituted benzene. Both the iron chloride catalyst and thionyl chloride are commonly present in an amount from about 0.05 to 1.0, preferably from about 0.1 to about 0.4, mole per mole of the substituted benzene. Typical reaction temperatures range from about 40° to about 80° C., preferably from about 40° to about 60° C.

The ortho chloroalkylated alkyl benzene is converted to an alkyl arylcyclobutene by pyrolysis in a hot tube packed with an inert material such as quartz chips or stainless steel at temperatures of 550° C. or greater and a pressure from about atmospheric and 25 mm mercury in a diluent (e.g., benzene, xylene, chlorobenzene and diphenyl acetate; with xylene being preferred) inert to the substituted benzene and stable at the pyrolysis temperatures. In general, temperatures from 700° to 750° C. and pressures from about 35 to about 25 mm mercury are preferred.

The vinyl arylcyclobutene can then be prepared by reaction of a suitably substituted arylcyclobutene with a suitable unsaturated compound. For example, the vinyl arylcyclobutene can be prepared from a brominated arylcyclobutene by reaction with an unsaturated alkyl compound. Specifically, 4-vinylbenzocyclobutene can be prepared by contacting the 4-bromobenzocyclobutene with ethylene or other olefinic compound in the presence of a palladium (II) acetate catalyst and a cocatalyst such as tri-o-tolylphosphine, and an appropriate base. In general, the reaction is preferably conducted at temperatures between 80° and 90° C. for periods from about 24 to about 48 hours. The resulting vinyl benzocyclobutene is recovered by distillation, preferably vacuum distillation. A trace of MEHQ (methyl ether of hydroquinone) is employed in the distillation as an inhibitor to prevent polymerization. It is conveniently removed from the vinyl benzocyclobutene by stirring the distillate over activated alumina.

In the method of the present invention, the grafting of the vinyl arylcyclobutene to the olefinic polymer is conducted in the presence of a free radical initiation means and at conditions sufficient to graft the vinyl arylcyclobutene on the polymer chain. Advantageously, the conditions of grafting avoid undesirable homopolymerization of vinyl arylcyclobutene or an undesirable amount of cross-linking.

The amounts of vinyl arylcyclobutene and the olefinic polymer most advantageously employed depends on a variety of factors including the specific vinyl arylcyclobutene and the olefinic polymer employed and the desired amount of grafting. While the vinyl arylcyclobutene can be employed in amounts from about 0.01 to as much as 100 weight percent or more based on the weight of the olefinic polymer, it is advantageously employed in an amount of 0.01 to about 5 weight percent based on the weight of the olefinic polymer. More advantageously, the vinyl arylcyclobutene is employed in an amount of from about 0.05 to about 5 weight percent based on the weight of the olefinic polymer. Preferably, the grafted olefinic polymer comprises from about 0.01 to about 0.05 pendant arylcyclobutene groups per 1000 carbon atoms, more preferably from about 0.05 to about 5 pendant arylcyclobutene groups per 1000 carbon atoms The free radical initiation means which are suitably employed in the practice of the present invention are those means which are capable of grafting the vinyl arylcyclobutene to the ethylene polymer. Representative examples of free radical initiation means include UV light, heat and/or chemical initiators such as peroxides (e.g., benzoyl peroxide; tert-butyl hydroperoxide; di-tert-butylperacetate; tert-butylperacetate; cumene hydroperoxide; tert-butyl peroctoate (2-ethyl hexanoate); 2,5-dimethyl-2,5-di(tert-butylperoxy)hexyne-3; and hydrogen peroxide), persulfates (e.g., potassium persulfate, sodium persulfate and ammonium persulfate), azo compounds (e.g., azobisisobutyronitrile) and the like. The free radical initiators most advantageously employed will depend on a variety of factors including the conditions at which the grafting reaction is conducted, the desired amount of grafting, the half-life of the initiator and the like. In general, the peroxides are the preferred free radical initiators, with benzoyl peroxide, tert-butyl peroctoate, and 2,5-dimethyl-2,5-di(tert-butylperoxy)hexyne-3 being more preferred: with benzoyl peroxide being most preferred.

The free radical initiator is employed in an amount sufficient to initiate the grafting reaction. While such amounts will vary depending on the specific free radical initiator, olefinic polymer and vinyl arylcyclobutene employed, and the time and temperature of the reaction, in general, a chemical free radical initiator is employed in an amount from 0.001 to about 5 weight percent, with amounts from about 0.01 to about 5 weight percent being preferred and amounts from about 0.05 to about 1 weight percent being more preferred, said weight percents being based on the total weight of the olefinic polymer and the vinyl arylcyclobutene.

While it is possible to employ a solvent or other reaction diluent, in general, no reaction diluent is employed. In general, the olefinic polymer and vinyl arylcyclobutene are contacted at temperatures sufficient to melt the olefinic polymer and the grafting reaction is conducted while the olefinic polymer is in this molten state. While these temperatures will vary depending on the specific olefinic polymer, vinyl arylcyclobutene, and free radical initiator employed as well as their concentrations, in general, the grafting reaction is conducted at temperatures from about 130° to about 350° C., preferably from about 140° to about 250° C., more preferably from about 150° to about 225° C. While the time of the grafting reaction will vary depending on the temperature and other factors, in general, the grafting reaction is allowed to proceed for at least 10 seconds, preferably 30 seconds, more preferably 1 minute. The grafting reaction may continue until the desired amount of grafting has been conducted. In general, grafting will be complete within 6 hours, preferably within 2 hours and more preferably within 1 hour.

A grafted polymer of the present invention has repeating units of the structural formulae:

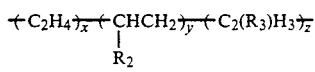

where —$R_2$ is

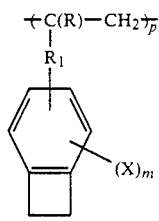

R, $R_1$, X, and m are as hereinbefore defined; $R_3$ can be an alkyl group having from 2 to 8 carbon atoms (preferably 2 to 6 carbon atoms); x can be any number more than 1; y can be 1 or more; z is 0 or a number of 1 or more; p is 2 or more; with the ratio of x:y:z being advantageously from about 99.99:0.01:0 to about 70:5:25, preferably from about 99.95:0.05:0 to about 82:3:15. The grafted polymer may be a random or block copolymer, i.e., the repeating $+C_2H_4+$ and $+C_2(R_3)H_3+$, if any, may form one or more distinct blocks within the polymer, may be randomly dispersed throughout the polymer chain, or some combination thereof wherein one or more of the repeating units is randomly distributed throughout a portion of the chain and in one or more blocks in a different portion of the polymer chain. Similarly the $+C(R_2)HCH_2+$ pendant groups may be located within one or more segments of the polymer chain or may be randomly dispersed throughout the polymer chain.

Following or simultaneous with the grafting reaction, the grafted polymer can be cross-linked/long chain branched. In general, such cross-linking/long chain branching reaction occurs by merely heating the grafted polymer. In practice, the cross-linking/long chain branching will generally occur essentially simultaneously or immediately following grafting. Cross-linking/long chain branching is evidenced by an increase in molecular weight. The time and temperature most advantageously employed for lightly cross-linking/long chain branching the grafted polymer will vary depending on a variety of factors including the specific polymer and the amounts of grafting. In general, the cross-linking/long chain branching reaction can be conducted at a temperature from about 180° to about 250° C., preferably from about 200° to about 230° C.; temperatures which often occur in the extrusion or other melt processing of the olefinic polymer.

Provided the time and temperature are sufficient, the grafting reaction is advantageously conducted during the extrusion or other conventional melt processing of the olefinic polymer prior to preparation of the final article in which case the cross-linking/long chain branching may occur during the extrusion or melt processing step to achieve the advantages of the present invention. For example, the grafting reaction can be conducted during such operations as extrusion, blowing of film, or blow or compression molding operations.

One preferred method of conducting the grafting reaction is in conventional mixing or extruding equipment such as an extruder, Brabender or Banbury mixer, roll mill or the like. In a particularly preferred embodiment, the grafting reaction is conducted in a twin-screw devolatilizing extruder (such as a Werner-Pfleider twin-screw extruder). In such method, the vinyl arylcyclobutene and free radical initiator are mixed and reacted with the olefinic polymer at molten temperatures, thereby producing and extruding the grafted polymer. Specifically, the vinyl arylcyclobutene and free radical initiator are injected into a pressurized section of the extruder filled with melted, olefinic polymer and the olefinic polymer and the vinyl arylcyclobutene mixed in the extruder for sufficient time to graft the vinyl arylcyclobutene to the olefinic polymer. Most preferably, the vinyl arylcyclobutene and free radical initiator are injected into the pressured section of the extruder in the manner described in U.S. Pat. No. 4,762,890. In general, the use of the co-rotating, twin-screw extruder results in a satisfactory grafting of the vinyl arylcyclobutene to the olefinic polymer without the need for additives or high extruder pressures.

Following the grafting reaction and/or cross-linking/long chain branching, unreacted arylcyclobutene can be removed from the reaction mixture using conventional vacuum devolatilization or distillation techniques well-known in the art. When using an extruder, devolatization will generally occur in one or more decompression sections of the extruder.

The arylcyclobutene grafted olefinic polymer, either before or after cross-linking/long chain branching, can be blended with one or more different polymers such as an olefinic polymer, a styrenic polymer (e.g. polystyrene, a rubber reinforced polystyrene (HIPS), a copolymer of styrene and acrylonitrile, including rubber reinforced copolymers of styrene and acrylonitrile); polycarbonate, epoxy resins and polyurethane resins. Pendant arylcyclobutene groups can react with either unsaturation or pendant arylcyclobutene groups on the polymers or resins with which it is blended. It is often advantageous to prepare a reactive blend of the arylcyclobutene grafted olefinic polymer by blending the grafted polymer prior to complete reaction of the arylcyclobutene pendant groups (i.e., at least one unreacted arylcyclobutene is pendant to the polymer chain) with the described resins and polymers. In addition, due to the reactivity of the arylcyclobutene pendant groups, they can be employed to compatibilize two or more different (and otherwise less compatible) polymers. For example, the arylcyclobutene grafted olefinic polymer can be blended with either polystyrene or a linear low density polyethylene or used to compatibilize, as a reactive blend, the polystyrene and linear low density polyethylene.

Optionally, other additives such as antioxidants, e.g., phenyl-β-naphthylamine, antifogging agents, dyes, plasticizers, pigments and the like can be added to the olefinic polymer, either prior to or subsequent to either the grafting reaction or the cross-linking/long chain branching reaction provided the additive does not adversely and significantly effect the grafting or the cross-linking/long chain branching reaction. In general, such other additives are well-known in the art and reference is made thereto for the purposes of this invention.

The following example is set forth to illustrate the present invention and should not be construed to limit its scope. In the example, all parts and percentages are by weight unless otherwise indicated.

Example 1

A capsule of 38.8 grams (g) molded from a linear low density polymer of a copolymer of 90 weight percent ethylene and 10 weight percent octene having a melt index of 1 (ASTM D-1238) and a density of 0.920 (ASTM D-792) and containing 0.08 g of a 70 percent active solution of benzoyl peroxide is prepared. The half life of the peroxide is 0.15 minutes at 150° C. Two additional capsules are similarly prepared, each containing 0.60 g of 4-vinylbenzocyclobutene. The 4-vinylbenzocyclobutene is prepared by the reaction of ethylene and bromobenzocyclobutene; the monomer being purified by vacuum distillation in the presence of a trace of MEHQ which is subsequently removed by stirring the product over activated alumina (Kaiser K-2).

These capsules and additional pellets of the LLDPE used in preparing the capsules (40 g total weight; 0.08 g of benzoyl peroxide, 1.2 g of 4-vinylbenzocyclobutene, the remainder being LLDPE) are added to the mixing chamber of a Haake Buchler Instruments Rheocord System 40 torque rheometer (50 milliliter (ml) capacity) with Rheomix 600 mixing chamber, roller style blades and inert bushings. The temperature in the mixing chamber on addition is 150° C. and the blades are rotating at 60 revolutions per minute (rpm). A nitrogen purge is established upon addition of the capsules. After two minutes, the blades are slowed to 13 rpm and held at that speed for 13 minutes; making total time of reaction 15 minutes. At this time, there should be little peroxide remaining.

The resulting polymer sample is then dried for 24 hours at 80° C. in a vacuum oven to remove any unreacted 4-vinylbenzocyclobutene. The resulting polymer is analyzed using $^1$H-NMR (o-dichlorobenzene solvent, JEOL GX-400 NMR spectrometer) which indicates the presence of a broad singlet at 3.03 ppm. This is a characteristic resonance of benzocyclobutene. Further analysis indicates the amount of 4-vinylbenzocyclobutene incorporated into the linear low density polyethylene is 0.55 pendant benzocyclobutene groups per 1000 carbon atoms which is equivalent to a polymer comprising 0.11 mole percent or 0.51 weight percent benzocyclobutene.

Using a Carver Model 2730-4 laboratory press equipped with a 2822-55 time and pressure release motorization package, a plaque of a portion of the resulting polymer is compression molded at 250° C. for 99 seconds without pressure and then for 99 seconds at 250° C. with 30,000 metric-tons pressure applied. The percent gels of the compression molded plaque is then determined using xylene extraction techniques. The plaque exhibits 1.085 percent gels which is comparable to the 1.005 percent gels exhibited by a sample of an unmodified linear low density polyethylene identical to that used in the grafting reaction. A portion of the unmodified linear low density polyethylene is treated in the same manner.

The unmodified linear low density polyethylene, both before and after compression molding, and the grafted polymer, both before and after compression molding are analyzed using GPC/LALLS techniques by first preparing a series of samples by first dissolving 0.1 g of the polymer in 50 ml of 1,2,3-trichlorobenzene (TCB) containing 250 ppm of butylated hydroxytoluene (BHT) as a free radical scavenger for sixteen hours at 160° C.

The LALLS analysis is conducted using a Chromatix Model KMX-6 Low Angle Laser Light Scattering instrument incorporating a He-Ne laser source with a wave length of 632.8 nanometers. GPC analysis is conducted using a Waters 150-C GPC/ALC. Analysis indicates that the weight average molecular weight of both the unmodified linear low density polyethylene and the grafted polymer before compression molding (i.e., heat treatment) is 126,000 whereas after compression molding the weight average molecular weight of the grafted polymer increases to 217,000 compared with a weight average molecular weight of the unmodified linear low density polyethylene after heat treatment of only 163,000: the increase in molecular weight being typical of unmodified ethylene polymers of the same type. The increase in molecular weight in the grafted polymer is due to the reaction of the grafted vinyl benzocyclobutene groups since the peroxide has been consumed. LALLS analysis also indicates an increase in long chain branching.

Differential scanning calorimetry is used to study the effect of cross-linking on the melting behavior of the grafted polymer in comparison to the unmodified polymer. A sample of each of the grafted polymer and the unmodified linear low density polyethylene is heated to 300° C. at the rate of 10° C./minutes under a nitrogen atmosphere to yield a first heat scan. The sample is then held at 300° C. for 5 minutes to complete any cross-linking reaction due to reaction of a grafted vinyl benzocyclobutene groups. The sample is then quench cooled and a second heat scan obtained up to 300° C. The DSC data indicates a greater change occurs, presumably due to the effect of enhanced cross-linking on crystallinity, in the grafted polymer as indicated the larger depression in peak melting temperature indicates between the first and second heating cycle.

What is claimed is:

1. An olefinic polymer derived from one or monomers having the formula $H_2C=CHR'$ where R' is hydrogen or an alkyl group grafted with a vinyl arylcyclobutene of the formula:

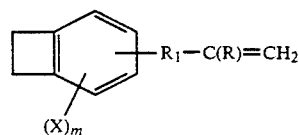

where R is hydrogen or $CH_3$; $R_1$ is $-(CH_2)_n-$ where n is from 0 to 6; X is halogen, an alkyl group having from 1 to 4 carbon atoms, phenyl, or $Si(CH_3)_3$; and m is 0 or 1.

2. The grafted olefinic polymer of claim 1 wherein R is hydrogen; n is from 0 to 4; m is 0 and the olefinic polymer is derived from ethylene or ethylene and one or more monomers copolymerizable therewith.

3. The grafted olefinic polymer of claim 2 wherein n is either 0 or 1.

4. The grafted olefinic polymer of claim 3 wherein the olefinic polymer comprises at least about 75 weight percent ethylene.

5. The grafted olefinic polymer of claim 4 wherein the olefinic polymer is high density polyethylene or linear low density polyethylene.

6. The grafted olefinic polymer of claim 5 wherein the olefinic polymer is linear low density polyethylene comprising, in polymerized form, from about 99 to 80 weight percent ethylene and from about 1 to about 20 weight percent of an α-olefin having from 4 to 8 carbon atoms.

7. The grafted olefinic polymer of claim 6 wherein the olefinic polymer is linear low density polyethylene comprising, in polymerized form, from about 98 to 85 weight percent ethylene and from about 2 to about 15 weight percent of 1-octene, 1-butene, 1-hexene, or 4-methyl-1-pentene.

8. A method for preparing the arylcyclobutene grafted olefinic polymer of claim 1 which method comprises reacting an olefinic polymer with a vinyl arylcyclobutene of the formula:

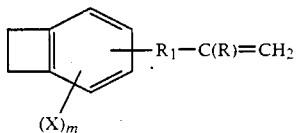

wherein R is hydrogen or $CH_3$; $R_1$ is $+CH_2+_n$ where n is from 0 to 6; X is halogen, an alkyl group having from 1 to 4 carbon atoms, phenyl, or $Si(CH_3)_3$; and m is 0 or 1 in the presence of an amount of a free radical initiation means and at conditions sufficient to graft the vinyl arylcyclobutene on the olefinic polymer chain.

9. The method of claim 8 the arylcyclobutene grafted olefinic polymer is further cross-linked/long chain branched either following or simultaneously with the grafting reaction.

10. The method of claim 8 wherein where n is either 0 or 1, and m is 0 and the olefinic polymer is an ethylene polymer.

11. The method of claim 10 wherein the olefinic polymer comprises at least about 75 weight percent ethylene.

12. The method of claim 11 wherein the olefinic polymer is linear low density polyethylene comprising, in polymerized form, from about 99 to 80 weight percent ethylene and from about 1 to about 20, weight percent of 1-octene, 1-butene, 1-hexene, or 4-methyl-1-pentene.

13. The method of claim 11 wherein the grafting reaction is conducted in an extruder.

14. The method of claim 13 wherein the extruder is a twin-screw devolatilizating extruder, the free radical initiation means is a chemical free radical initiator, and the vinyl arylcyclobutene and free radical initiator are mixed and reacted with a melted olefinic polymer.

15. The method of claim 13 wherein the cross-linking/long chain branching is conducted during the extrusion.

16. A ethylene polymer comprising the following structural formula;

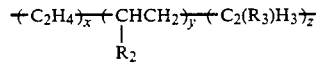

where $—R_2$ is

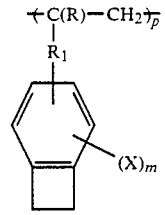

R is hydrogen or $CH_3$; $R_1$ is $+CH_2+_n$ where n is from 0 to 6; $R_3$ is an alkyl group having from 2 to 8 carbon atoms; and X is halogen, an alkyl group having from 1 to 4 carbon atoms, phenyl, or $Si(CH_3)_3$; m is 0 or 1; x is 1 or more; y is 1 or more; z is 0 or a number of 1 or more; and p is 2 or more.

17. The ethylene polymer of claim 16 wherein the ratio of x:y:z is from about 99.99:0.01:0 to about 70:5:25.

18. The ethylene polymer of claim 17 wherein $R_3$ is an alkyl group having 2 to 6 carbon atoms; R is hydrogen; and m is 0.

19. The ethylene polymer of claim 18 wherein the the ratio of x:y:z is from about 99.95:0.05:0 to about 82:3:15.

20. The grafted olefinic polymer of claim 16 wherein z if 0.

* * * * *